(12) United States Patent
Cha

(10) Patent No.: US 10,797,532 B2
(45) Date of Patent: Oct. 6, 2020

(54) INTELLIGENT WIRELESS POWER TRANSMITTER, CHARGING SYSTEM USING INTELLIGENT WIRELESS POWER AND INTELLIGENT WIRELESS POWER-PROVIDING METHOD

(71) Applicant: KOREA ELECTRONICS TECHNOLOGY INSTITUTE, Seongnam-si, Gyeonggi-do (KR)

(72) Inventor: Cheolung Cha, Seoul (KR)

(73) Assignee: KOREA ELECTRONICS TECHNOLOGY INSTITUTE, Gyeonggi-Do (KR)

( * ) Notice: Subject to any disclaimer, the term of this patent is extended or adjusted under 35 U.S.C. 154(b) by 31 days.

(21) Appl. No.: 16/128,188

(22) Filed: Sep. 11, 2018

(65) Prior Publication Data

US 2019/0081514 A1    Mar. 14, 2019

(30) Foreign Application Priority Data

Sep. 11, 2017 (KR) .................. 10-2017-0115981

(51) Int. Cl.
| | | |
|---|---|---|
| *H02J 7/02* | (2016.01) | |
| *H02J 50/23* | (2016.01) | |
| *H01Q 3/34* | (2006.01) | |
| *H01Q 21/20* | (2006.01) | |
| *H01Q 3/36* | (2006.01) | |
| *H01Q 21/06* | (2006.01) | |
| *H01Q 9/04* | (2006.01) | |

(52) U.S. Cl.
CPC .............. *H02J 50/23* (2016.02); *H01Q 3/34* (2013.01); *H01Q 3/36* (2013.01); *H01Q 21/065* (2013.01); *H01Q 21/20* (2013.01); *H01Q 21/205* (2013.01); *H02J 7/025* (2013.01); *H01Q 9/0407* (2013.01)

(58) Field of Classification Search
CPC ....................................................... H02J 7/025
USPC ......................................................... 320/108
See application file for complete search history.

(56) References Cited

U.S. PATENT DOCUMENTS

| | | | |
|---|---|---|---|
| 9,711,998 | B2 | 7/2017 | Nakano et al. |
| 10,008,885 | B2 | 6/2018 | Nakano et al. |
| 10,014,727 | B2 | 7/2018 | Nakano et al. |
| 10,020,689 | B2 | 7/2018 | Nakano et al. |
| 10,069,347 | B2 | 9/2018 | Nakano et al. |
| 2016/0049831 | A1 | 2/2016 | Nakano et al. |
| 2016/0099757 | A1 | 4/2016 | Leabman et al. |
| 2017/0222487 | A1 | 8/2017 | Nakano et al. |
| 2017/0353057 | A1 | 12/2017 | Nakano et al. |
| 2017/0353058 | A1 | 12/2017 | Nakano et al. |

(Continued)

FOREIGN PATENT DOCUMENTS

| | | |
|---|---|---|
| KR | 10-2012-0009929 A | 2/2012 |
| KR | 10-2017-0100649 A | 9/2017 |
| WO | 2014/156465 A1 | 10/2014 |

*Primary Examiner* — Edward Tso
*Assistant Examiner* — Ahmed H Omar
(74) *Attorney, Agent, or Firm* — Knobbe Martens Olson & Bear LLP

(57) ABSTRACT

The present disclosure relates to an intelligent wireless power transmitter. The intelligent wireless power transmitter includes an array antenna module configured to transmit microwaves, and a local controller configured to control a phase of the array antenna module so that the microwaves radiated through the array antenna module is transmitted to a target wireless power receiver.

9 Claims, 8 Drawing Sheets

(56) References Cited

U.S. PATENT DOCUMENTS

2017/0353059 A1    12/2017  Nakano et al.
2018/0375381 A1    12/2018  Nakano et al.
2019/0044389 A1*    2/2019  Lee .......................... H02J 50/23
2019/0115656 A1*    4/2019  Fukumoto ................ H01Q 3/08

* cited by examiner a = AMOUNT OF PHASE SHIFT
(NEGATIVE NUMBER)

a = AMOUNT OF PHASE SHIFT
(NEGATIVE NUMBER)

INTELLIGENT WIRELESS POWER TRANSMITTER, CHARGING SYSTEM USING INTELLIGENT WIRELESS POWER AND INTELLIGENT WIRELESS POWER-PROVIDING METHOD

This application claims priority to and the benefit of Korean Patent Application No. 2017-0115981, filed on Sep. 11, 2017, the disclosure of which is incorporated herein by reference in its entirety.

BACKGROUND

1. Field

The present application relates to an intelligent wireless power transmitter, and more particularly, to an intelligent wireless power transmitter in a system for transmitting wireless power using microwaves, which allows microwaves transmitted to a wireless power receiver to have directivity and distributes outputs of a plurality of wireless power transmitters to enable efficient wireless power charging.

2. Description of the Related Art

Generally, installations such as nuclear power plants and chemical factories are installations with environmental conditions such as air pollution, water pollution, and toxic gas leakage.

Therefore, in such extreme environments, systems in which sensors for sensing each environment operate continuously and collect relevant information are required.

However, one of the limitations of conventional installations in extreme environments is the difficulty in which a battery should be replaced due to a limited lifetime thereof. That is, in nuclear power installations and toxic gas installations, a person has limited access to a sensor for sensing environmental information, and thus it is not easy to replace the sensor and a battery of the sensor.

Meanwhile, Internet of Things (IoT) technology is a technology, which is applied to various sensors and personal portable devices with a wireless communication function to check various situations and states of a specific space such as a home, an office, a factory, or the like and to execute user's preferences and requirements via communication between objects in a state of a user's not being consciously aware.

To this end, various sensors are used for monitoring situations and surrounding environments such as temperature, humidity, infrared rays, illumination, a gas sensor, and the like and wireless communication is used for transmitting and sharing information.

Power is supplied to the installations only by charging and replacing batteries which are installed for driving of sensors and for wireless communication.

In order to charge a power source with power, there is the inconvenience in that the power source has to be connected through an electrical wire or be replaced.

In order to address the above disadvantages, a technique of transmitting and charging wireless power has been applied.

The wireless power transmitting and charging technique is summarized as follows. There are an electromagnetic induction system using a near field, a magnetic resonance system using frequency resonance, and a radio wave radiation system.

In the wireless power transmitting and charging technique of the conventional radio wave radiation system, a wireless power transmitter radiates microwaves in an omni-directional manner and a wireless power receiver receives the microwaves which are radiated in the omni-directional manner. However, since the wireless power transmitting and charging technique of the conventional radio wave radiation system is a technique in which an electrical signal is used as electric power, there is a problem in that an energy amount of signals to be used is large unlike communication, which is harmful to the human body.

SUMMARY

An aspect of the present invention is directed to providing an intelligent wireless power transmitter which controls beamforming of microwaves to improve transmission efficiency and extend a transmission distance when power is supplied to a wireless power receiver using microwaves.

Further, an aspect of the present invention is directed to providing an intelligent wireless power transmitter capable of providing power by distributing power to a wireless power receiver through a plurality of wireless power transmitters.

Further, an aspect of the present invention is directed to providing an intelligent wireless power transmitter capable of avoiding an obstacle using a beam steering technique.

According to an aspect of the present invention, there is provided an intelligent wireless power transmitter including an array antenna module configured to transmit microwaves, and a local controller configured to control a phase of the array antenna module so that microwaves radiated through the array antenna module are transmitted to a target wireless power receiver.

The local controller may perform beamforming for focusing power of the microwaves, which are radiated through the array antenna module, on the wireless power receiver.

According to another aspect of the present invention, there is provided a charging system using intelligent wireless power including at least one wireless power transmitter including an array antenna module configured to transmit microwaves, and a local controller configured to control the array antenna module so that the microwaves radiated through the array antenna module are transmitted to a target wireless power receiver, and a power distribution control unit configured to control the wireless power transmitters so that power of the microwaves radiated from each of the wireless power transmitters is distributed and transmitted to one target wireless power receiver.

In the plurality of array antenna modules, n×m microstrip patch antennas may be arranged.

A distance between the microstrip patch antennas of the plurality of array antenna modules may be λ/2, and a gain value of the array antenna is expressed by Equation 1:

$$E_t = E_{se} \times AF \quad \text{[Equation 1]}$$

Here, $E_t$ denotes a gain value of the array antenna, $E_{se}$ denotes a gain value of a single patch antenna, and AF denotes an array vector value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Advantages and features of the described technology and methods of achieving the same should be clearly understood with reference to the accompanying drawings and the following detailed embodiments. However, the present invention is not limited to the embodiments to be disclosed below and may be implemented in various different forms. The embodiments are provided in order to fully explain the present invention and fully explain the scope of the present invention for those skilled in the art. The scope of the present invention is defined by the appended claims. Meanwhile, terms used herein are provided only to describe the embodiments of the present invention and not for purposes of limitation. Unless the context clearly indicates otherwise, the singular forms include the plural forms. It should be understood that the terms "comprise" and/or "comprising," when used herein, specify some stated components, steps, operations, and/or elements, but do not preclude the presence or addition of one or more other components, steps, operations, and/or elements.

Hereinafter, embodiments of the present invention will be described in detail with reference to the accompanying drawings.

Figure 1:
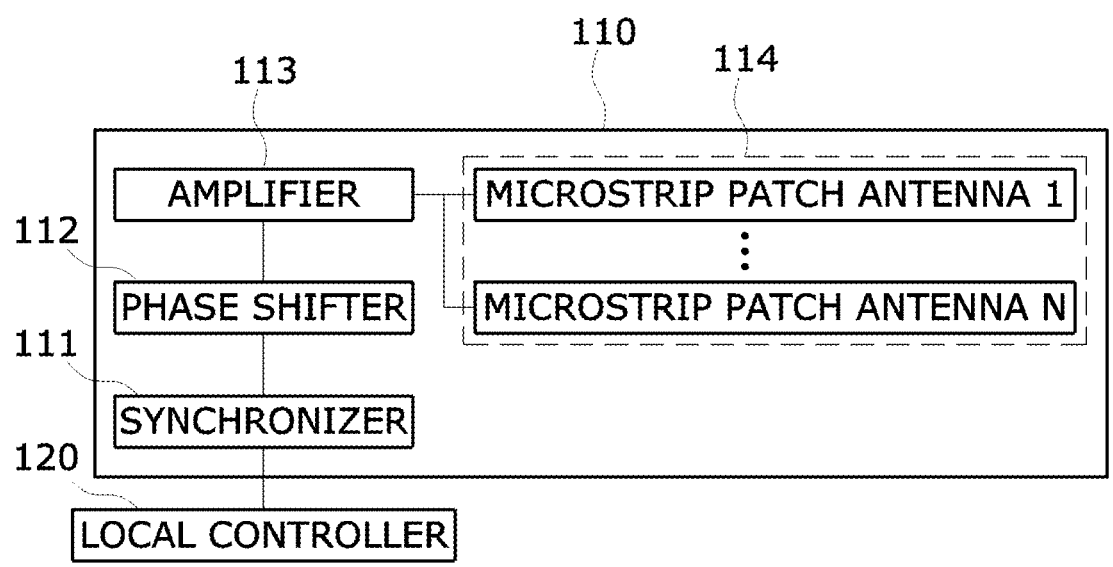
FIG. 1 is a functional block diagram for describing an intelligent wireless power transmitter according to an embodiment of the present invention.

FIG. 1 is a functional block diagram for describing an intelligent wireless power transmitter according to an embodiment of the present invention.

As shown in FIG. 1, the intelligent wireless power transmitter according to an embodiment of the present invention includes at least one array antenna module 110 and a local controller 120.

The array antenna module 110 serves to transmit microwaves, with which wireless charging is possible, to a wireless power receiver.

The array antenna module 110 employed in an embodiment of the present invention includes a synchronizer 111, a phase shifter 112, an amplifier 113, and a plurality of microstrip patch antennas 114. In an embodiment of the present invention, the array antenna module 110 is formed in units of modules and provided to allow an output of the wireless power transmitter to be extended.

The synchronizer 111 synchronizes channels of the microstrip patch antennas 114 under control of the local controller 120.

The phase shifter 112 changes phases of the channels of the microstrip patch antennas 114 under control of the local controller 120.

The amplifier 113 amplifies microwaves, which are radiated through the microstrip patch antennas 114, under control of the local controller 120.

The plurality of microstrip patch antennas 114 are arranged, and, n×m microstrip patch antennas 114 are arranged. Further, a distance between the microstrip patch antennas 114 is may be λ/2.

The local controller 120 controls the array antenna module 110 so that microwaves radiated through the array antenna module 110 may be transmitted to a target wireless power receiver 10.

In this case, a gain value of an array antenna module is expressed by Equation 1 below.

$$E_t = E_{se} \times AF \qquad \text{[Equation 1]}$$

Here, $E_t$ denotes a gain value of the array antenna module, Ese denotes a gain value of a single patch antenna, and AF denotes an array vector value.

The local controller 120 performs beamforming for controlling power of the microwaves radiated through the microstrip patch antennas 114 of the array antenna module 110 to be concentrated on the target wireless power receiver 10.

Figure 2A:
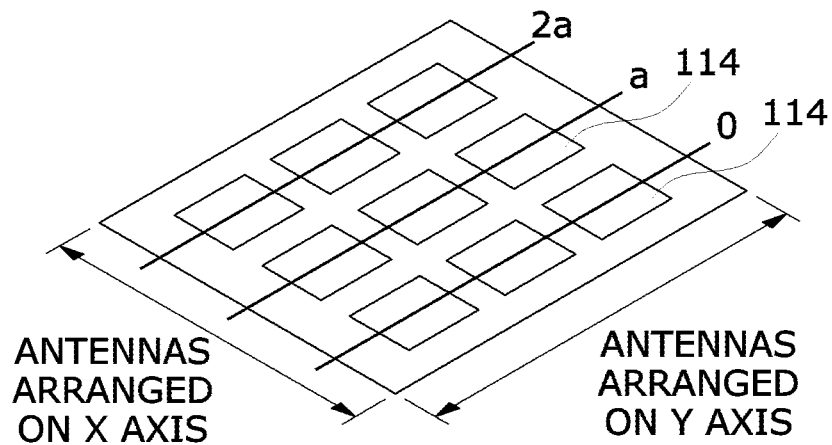
FIG. 2A and FIG. 2B show reference views for describing beamforming of a wireless power transmitter according to an embodiment of the present invention.
Figure 2B:
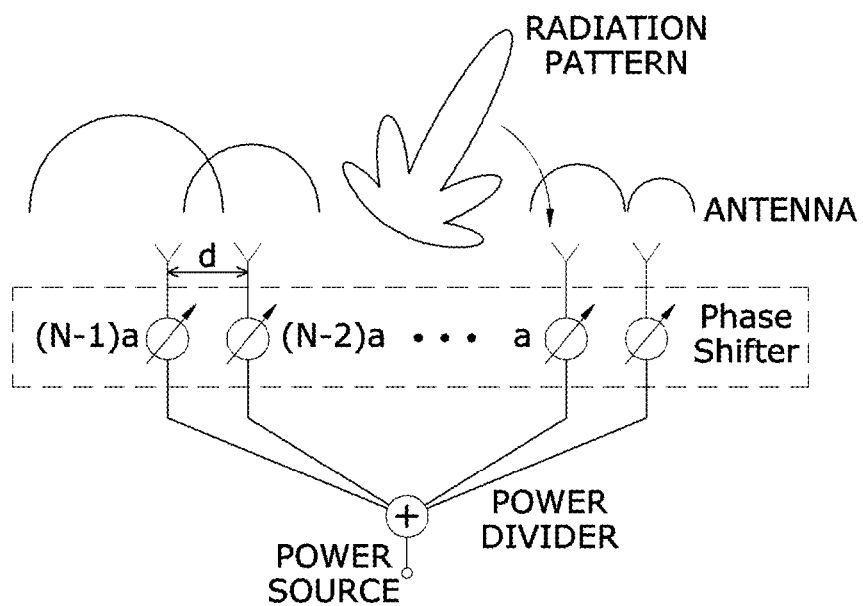

FIG. 2A and FIG. 2B show reference views for describing beamforming of the wireless power transmitter according to an embodiment of the present invention. As shown in FIG. 2A, the local controller 120 may change phases of channels of microstrip patch antennas 114 arranged in an array of 3×3 to change the directivity of microwaves which are output as shown in FIG. 2B.

TABLE 1

| Parameters | |
|---|---|
| Frequency | 5.53 GHz |
| Number of antennas arranged on X axis | 3 |
| Number of antennas arranged on Y axis | 3 |
| Phase difference between antennas arranged on X axis | 0 degrees |
| Phase difference between antennas arranged on Y axis | 70 degrees |

Figure 3A:
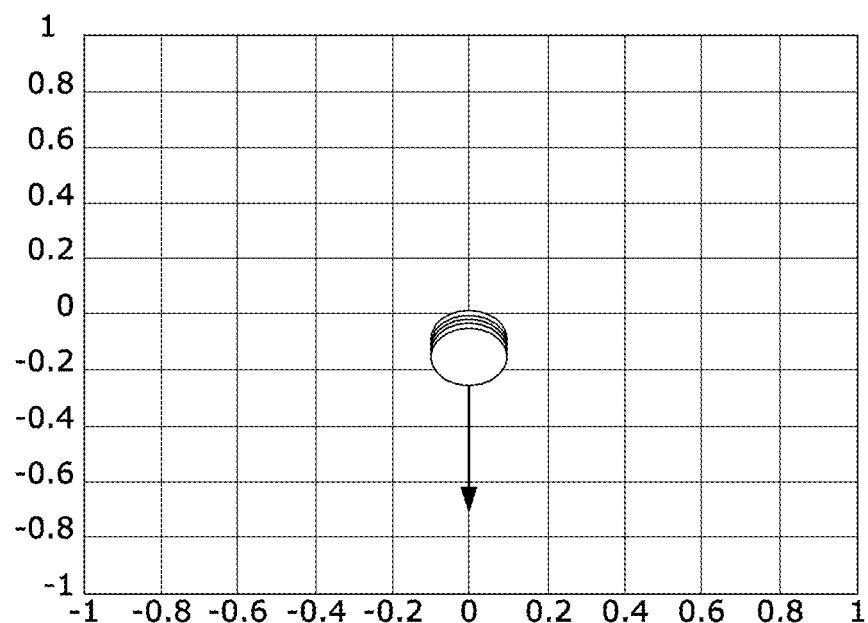
FIG. 3A and FIG. 3B are a set of views for describing examples of beamforming formation according to an arrangement of antennas and a phase difference between antennas of a wireless power transmitter according to an embodiment of the present invention.

For example, when a phase difference between antennas arranged on an X axis is 0 degrees and a phase difference between antennas arranged on a Y axis is 70 degrees, as shown in Table 1, microwaves are formed in a direction (0,−Y) as shown in FIG. 3A.

TABLE 2

| Parameters | |
|---|---|
| Frequency | 5.53 GHz |
| Number of antennas arranged on X axis | 3 |
| Number of antennas arranged on Y axis | 3 |
| Phase difference between antennas arranged on X axis | 70 degrees |
| Phase difference between antennas arranged on Y axis | 70 degrees |

Figure 3B:
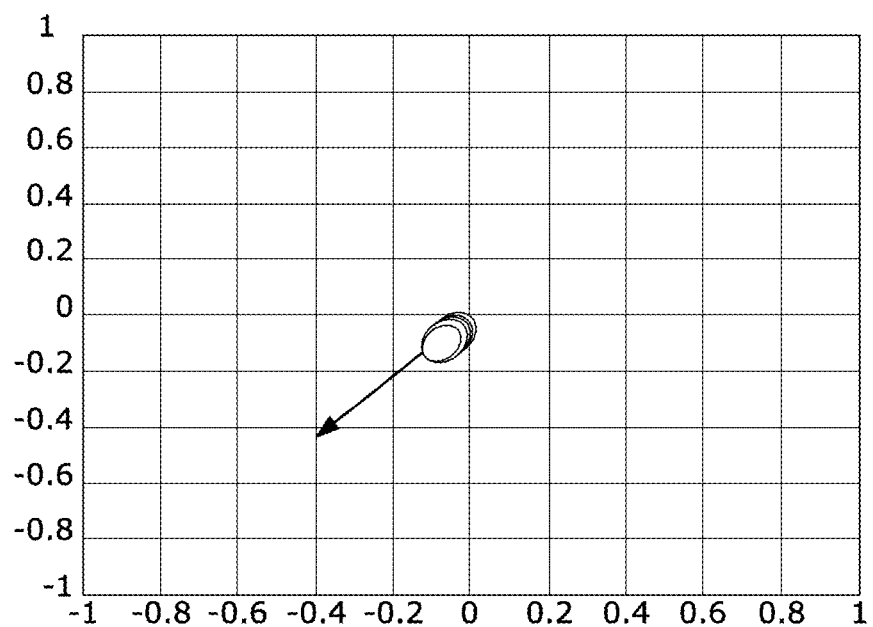

When a phase difference between antennas arranged on an X axis is 70 degrees and a phase difference between antennas arranged on a Y axis is 70 degrees, as shown in Table 2, the direction of the microwaves is changed to a direction (−X,−Y), as shown in FIG. 3B.

Figure 4:
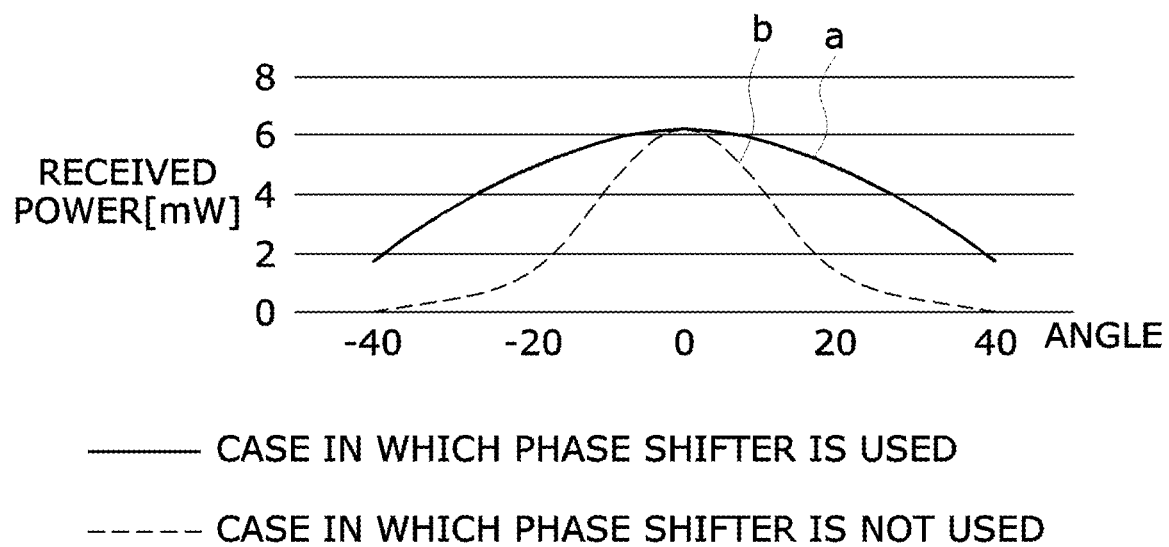
FIG. 4 is a view for describing examples of received power for each position according to a change of a phase of a wireless power transmitter according to an embodiment of the present invention.

FIG. 4 is a view for describing an example of received power for each position according to a change of a phase of the wireless power transmitter according to an embodiment of the present invention.

As shown in FIG. 4, when comparing amounts of power transmission per angle at 1.5 m, a power amount a when a phase change is used and a power amount b when a phase change is not used are different according to a phase difference.

According to an embodiment of the present invention, there is an advantage in that the phases of the channels of the microstrip patch antennas are changed and a degree of concentration and a direction of the microwaves transmitted to the wireless power receiver are changed, so that a transmission distance of the microwaves may extend and a transmission amount of the microwaves may be improved.

According to an embodiment of the present invention, since microwaves, which are a source of wireless power, has directivity, it is possible to prevent the microwaves from being radiated to a human body indiscriminately.

Further, according to an embodiment of the present invention, there is an advantage in that wireless power may be simultaneously supplied to a plurality of wireless power receivers.

Figure 5:
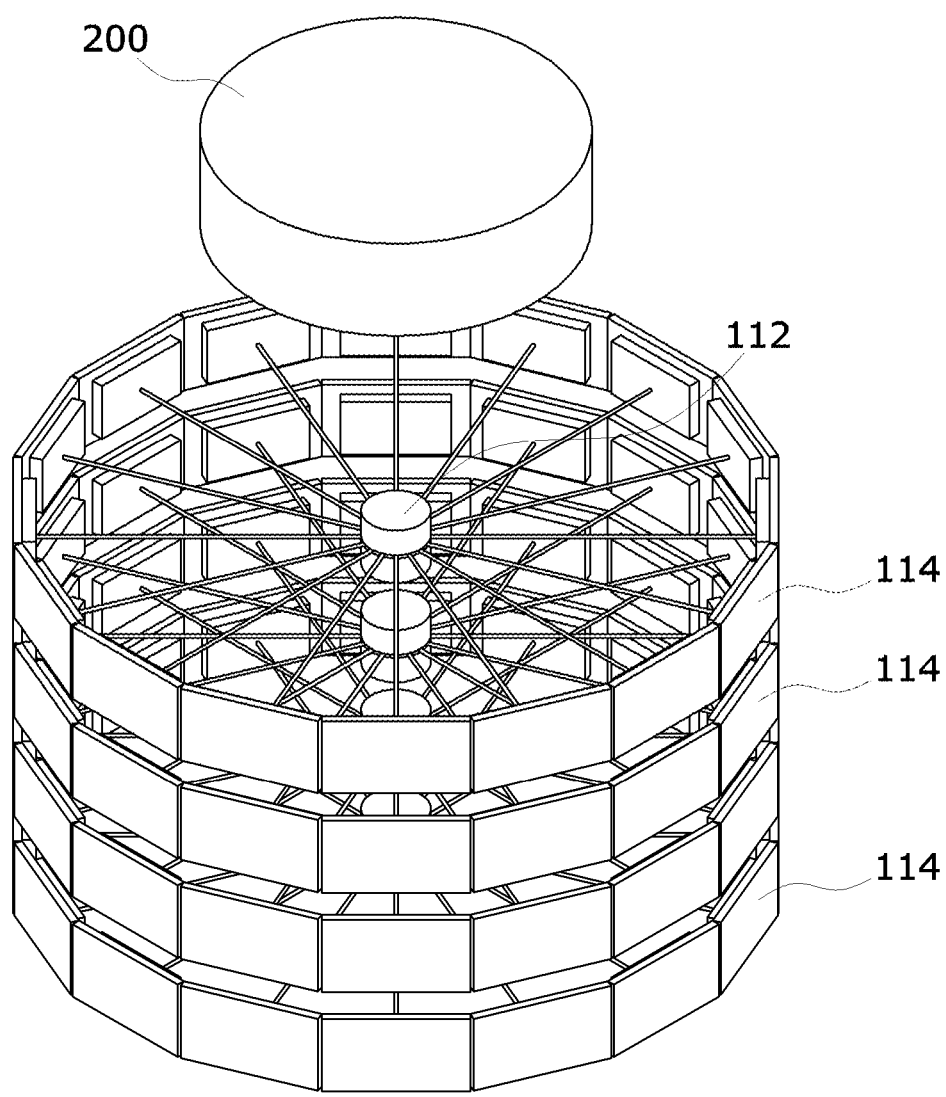
FIG. 5 is a perspective view showing another example of a wireless power transmitter according to an embodiment of the present invention.

FIG. 5 is a perspective view showing another example of a wireless power transmitter according to an embodiment of the present invention. As shown in FIG. 5, in an array antenna module employed in an embodiment of the present invention, a plurality of microstrip patch antennas 114 may be arranged in a cylindrical shape, and the antenna module, in which the plurality of microstrip patch antennas 114 are arranged in the cylindrical shape, may be stacked around a central axis of the cylinder. Alternatively, the array antenna module may be formed to have a spherical shape.

Figure 6:
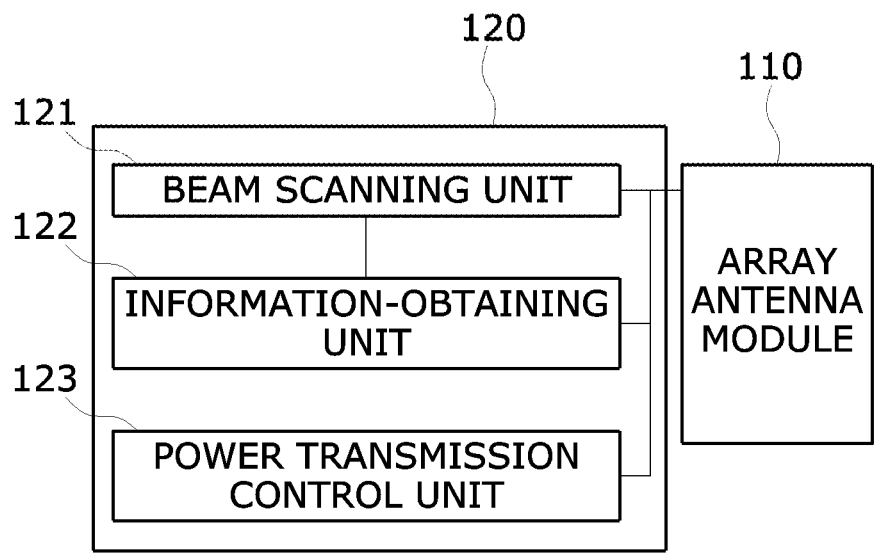
FIG. 6 is a functional block diagram showing a configuration of a local controller employed in an embodiment of the present invention.

FIG. 6 is a functional block diagram showing a configuration of the local controller employed in an embodiment of the present invention. As shown in FIG. 6, the local controller 120 employed in an embodiment of the present invention includes a beam scanning unit 121, an information-obtaining unit 122, and a power transmission control unit 123.

The beam scanning unit 121 performs beam scanning for radiating microwaves for beam scanning through a microstrip patch antenna so as to collect position recognition information of the wireless power receiver 10, position information of an obstacle, and moving state information of the wireless power receiver 10 and receiving a response signal from the wireless power receiver 10.

The information-obtaining unit 122 obtains wireless power transmission information using the response signal received from the wireless power receiver 10.

Further, the power transmission control unit 123 changes a setting of beamforming of microwaves transmitted to a corresponding wireless power receiver 10 according to the obtained wireless power transmission information. That is, the power transmission control unit 123 changes settings of the synchronizer 111, the phase shifter 112, and the amplifier 113 of the wireless power transmitter 100.

The microwaves of which the setting of beamforming is changed are transmitted to the corresponding wireless power receiver 10 through the wireless power transmitter 100.

Meanwhile, the wireless power transmission information in an embodiment of the present invention includes at least one of obstacle position information, moving state information, optimal wireless power transmission path information, charging state information of the wireless power receiver 10, and charging priority information.

On the other hand, the power transmission control unit 123 employed in an embodiment of the present invention transmits microwaves to a corresponding wireless power receiver 10 according to preset charging priority information.

Figure 7:
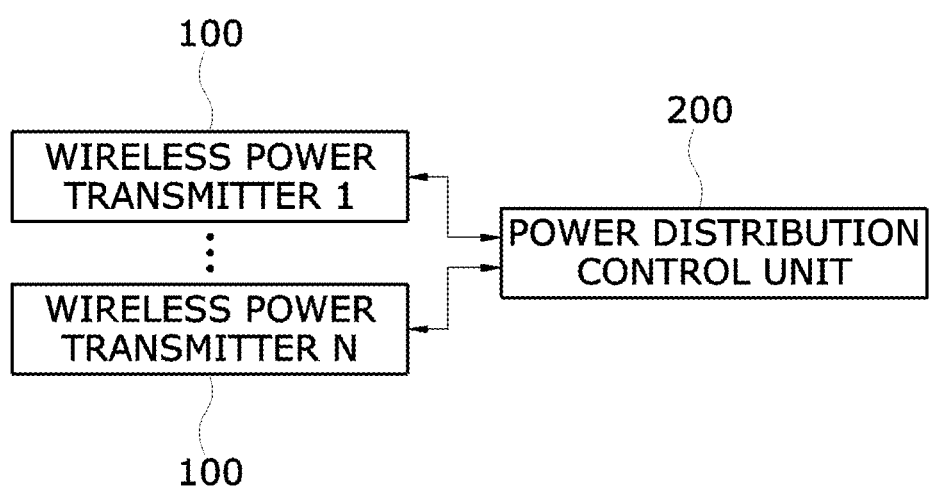
FIG. 7 is a diagram for describing a charging system using intelligent wireless power according to another embodiment of the present invention.
Figure 8:
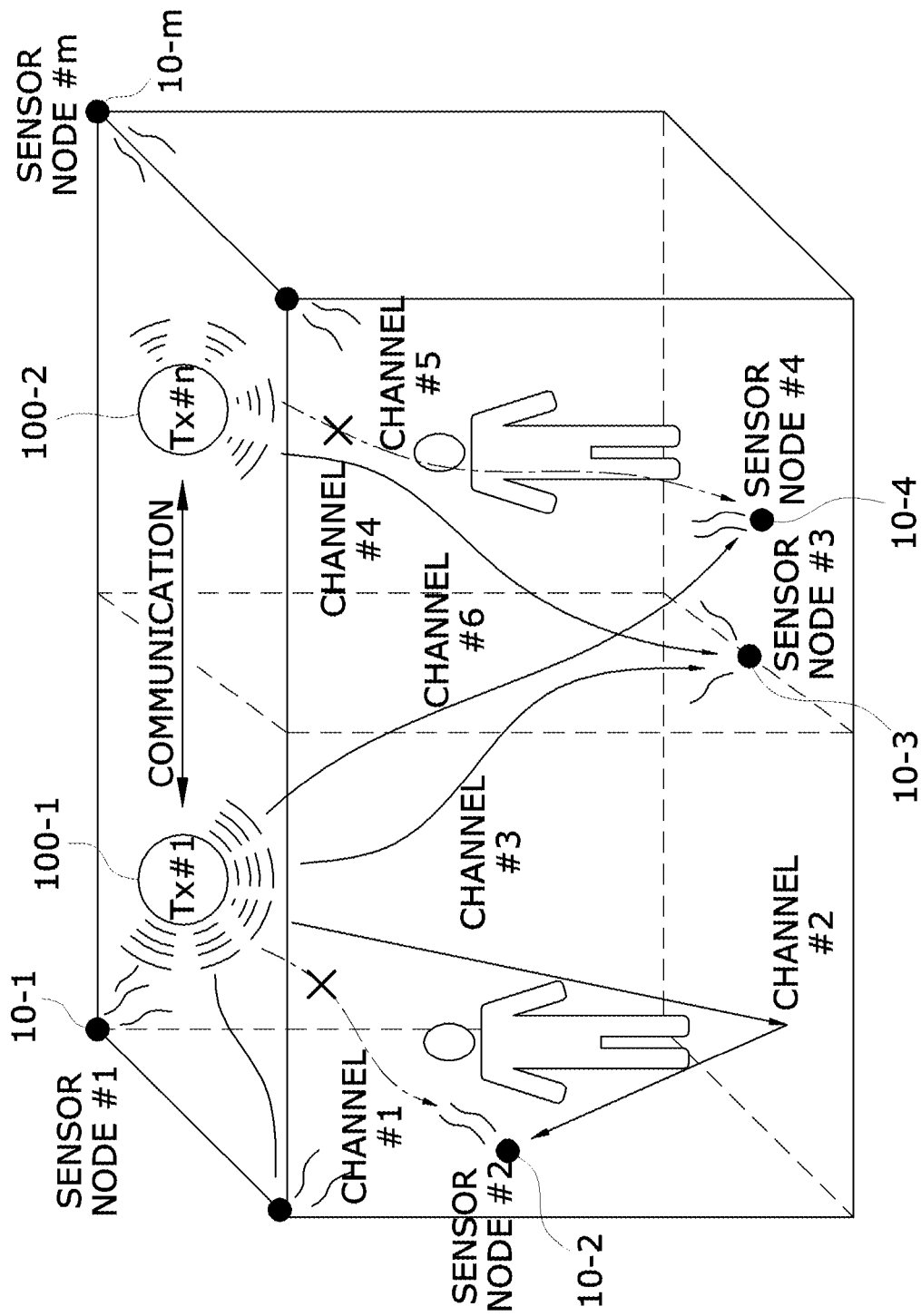
FIG. 8 is a reference view for describing another embodiment of the present invention.

FIG. 7 is a diagram for describing a charging system using intelligent wireless power according to another embodiment of the present invention, and FIG. 8 is a view for describing another embodiment of the present invention.

As shown in FIG. 7, the charging system using intelligent wireless power according to another embodiment of the present invention includes at least one wireless power transmitter 100 and a power distribution control unit 200. In this case, the power distribution control unit 200 may be provided in any one of a plurality of wireless power transmitters 100, or may be respectively provided in the wireless power transmitters 100.

When a plurality of power distribution control units 200 are each provided in a corresponding one of the wireless power transmitters 100, a main power distribution control unit 200 is determined through communication between the wireless power transmitters 100 and preferably operates under control of the main power distribution control unit 200. The remaining power distribution control units excluding the main power distribution control unit preferably serve to perform backup of the main power distribution control unit.

Meanwhile, the wireless power transmitters 100 each include the array antenna module 110 and the local controller 120 according to an embodiment of the present invention. Meanwhile, since the wireless power transmitter 100 has already been described in an embodiment of the present invention, a description thereof will be omitted.

The power distribution control unit 200 serves to control the array antenna modules 110 of the wireless power transmitters 100 so that microwaves radiated from the respective wireless power transmitters 100 may be distributed and transmitted to one target wireless power receiver 10.

As shown in FIG. 8, the power distribution control unit 200 controls a plurality of wireless power transmitters 100-1 and 100-2 so that microwaves transmitted from the plurality of wireless power transmitters 100-1 and 100-2 may be distributed and transmitted to a wireless power receiver 10-3.

There is an advantage in that the conventional single wireless power transmitter 100 can overcome a disadvantage that heat is generated when a high output is applied in order to cope with charging of a high capacity receiver and the efficiency of an amplifier is lowered due to the generated heat.

Meanwhile, the plurality of wireless power transmitters 100-1 and 100-2 supply wireless power to a plurality of wireless power receivers 10-1 to 10-m.

For example, as shown in FIG. 8, when it is desired to supply power to a target wireless power receiver 10-3 using microwaves, the power distribution control unit 200 distributes an amount of supplied power of each of the wireless power transmitters 100-1 and 100-3.

Here, one of various methods may be used as a method of distributing the amount of supplied power of each of the wireless power transmitters 100 by the power distribution control unit 200.

To this end, the power distribution control unit 200 controls each of the wireless power transmitters 100 to perform a beam scanning operation.

Here, the wireless power transmitter 100 performs a beam scanning operation for radiating a search signal and collecting a response signal received from the wireless power receiver 10.

The position information of the wireless power receiver 10 to which wireless power is desired to be supplied, moving state information, optimal wireless power transmission path information, charging state information of the receiver, charging priority information, wireless power supply amount information, obstacle position information, and the like, may be determined through the beam scanning operation.

The beam scanning operation may be performed every preset time. When the beam scanning operation is performed every preset time, information of a mobile wireless power receiver as well as a fixed wireless power receiver may be obtained.

Meanwhile, the power transmission control unit 123 employed in an embodiment of the present invention controls microwaves transmitted from the wireless power transmitters 100-1 and 100-2 closest to a corresponding wireless power receiver 10 to be transmitted when no obstacle is positioned between the wireless power transmitter 100 and the wireless power receivers 10 such as wireless power receivers 10-1, 10-2, 10-5, and 10-*m*.

For example, the power transmission control unit 123 controls each of the wireless power transmitters so that the microwaves of the wireless power transmitter 100-1 are transmitted to the wireless power receivers 10-1 and 10-2 and the microwaves of the wireless power transmitter 100-2 are transmitted to the wireless power receivers 10-5 and 10-*m*.

On the other hand, the power transmission control unit 123 transmits the microwaves to the wireless power receiver 10 through the wireless power transmitter where no obstacle is positioned when an obstacle is positioned between the wireless power transmitter 100 and any one of the plurality of wireless power receivers 10, such as a wireless power receiver 10-4.

As shown in FIG. 8, when an obstacle is positioned between the wireless power transmitter 100-2 and the wireless power receiver 10-4, the power transmission control unit 123 controls the microwaves not to be transmitted to the wireless power receiver 10-4 through the wireless power transmitter 100-2 and the microwaves to be transmitted to the wireless power receiver 10-4 through another wireless power transmitter 100-1.

According to another embodiment of the present invention, it is possible to prevent the conventional microwaves from being radiated and being transmitted to the human body indiscriminately.

The power distribution control unit 200 may distribute a power amount of the microwaves of the wireless power transmitter 100 using the information obtained by performing the beam scanning operation.

According to the power distribution control unit 200 employed in another embodiment of the present invention, there is an advantage in that wireless power may be stably supplied to the wireless power receiver while maintaining the output regulation of the wireless power transmitter.

Further, according to another embodiment of the present invention, there is an advantage in that the power distribution control unit 200 may control wireless power so as to be simultaneously supplied to the plurality of wireless power receivers.

Figure 9:
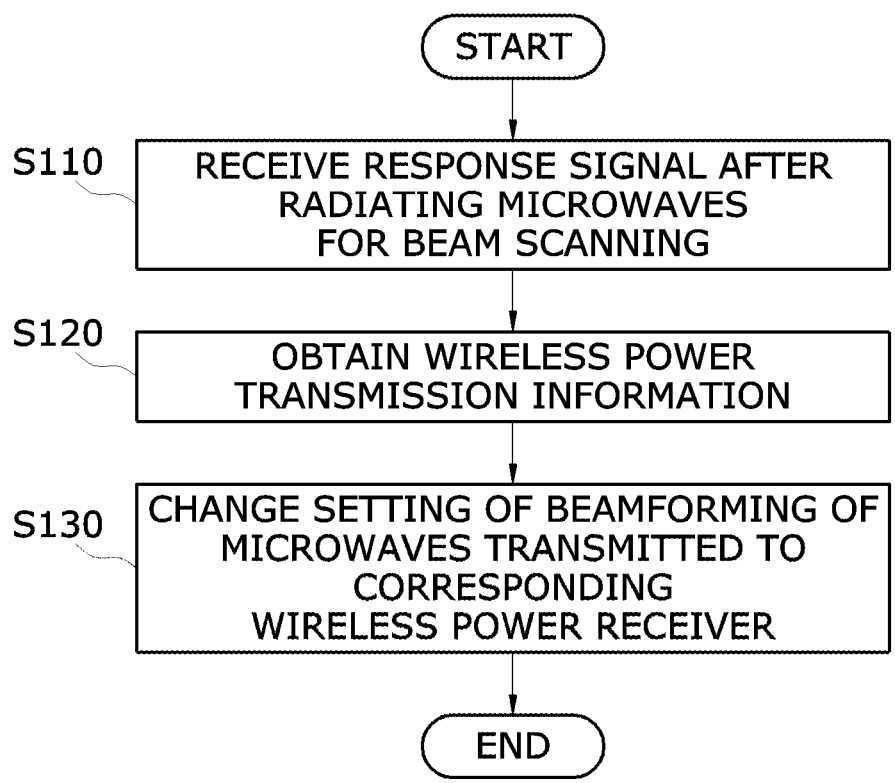
FIG. 9 is a flowchart for describing an intelligent wireless power-providing method according to another embodiment of the present invention.

Hereinafter, an intelligent wireless power-providing method according to another embodiment of the present invention will be described with reference to FIG. 9.

The intelligent wireless power-providing method according to an embodiment of the present invention is performed by at least one wireless power transmitter 100.

First, the wireless power transmitter 100 performs beam scanning for radiating microwaves for beam scanning so as to collect position recognition information of the wireless power receiver 10, position information of an obstacle, and moving state information of the wireless power receiver 10 and receiving a response signal from the wireless power receiver 10 (S110).

Then, the wireless power transmitter 100 obtains wireless power transmission information using the response signal received from the wireless power receiver 10 (S120).

Thereafter, the wireless power transmitter 100 changes a setting of beamforming of microwaves transmitted to the corresponding wireless power receiver 10 according to the obtained wireless power transmission information and transmits the microwaves (S130).

Here, the wireless power transmission information includes at least one of obstacle position information, moving state information, optimal wireless power transmission path information, charging status information of the wireless power receiver 10, and charging priority information.

Meanwhile, in the transmitting of the microwaves (S130), when no obstacle is positioned between the wireless power transmitter and the wireless power receiver 10, the microwaves are transmitted to the closest wireless power receiver 10.

On the other hand, in the transmitting of the microwaves (S130), when an obstacle is positioned between the wireless power transmitter and any one of the plurality of wireless power receivers 10, the microwaves are transmitted to the wireless power receiver 10 through the wireless power transmitter 100 where no obstacle is positioned.

Meanwhile, in the transmitting of the microwaves (S130), the microwaves are transmitted to the corresponding wireless power receiver 10 according to the preset charging priority information.

According to an embodiment of the present invention, microwaves transmitted to a wireless power receiver are controlled to have directivity, and thus a power transmission distance can be increased, transmission efficiency can be improved, the harmfulness of electromagnetic wave can be reduced, and a transmission angle can be adjusted even when a position of the wireless power receiver is changed.

According to another embodiment of the present invention, beam scanning of a plurality of wireless power transmitters capable of communicating with each other in space is applied to determine position information of a wireless power receiver, optimal power transmission path setting information, position information of an obstacle between the wireless power transmitter and the wireless power receiver, and moving state information of the wireless power receiver, and thus a hazard to a human body can be reduced, transmission efficiency can be improved, and interference of a peripheral electronic device can be minimized.

According to another embodiment of the present invention, the reduction of heat generation, the improvement of efficiency, and the regulation of electromagnetic wave output of the individual transmitter can be addressed due to transmission power sharing between multiple wireless power transmitters, coverage sharing between individual transmitters can enable rapid charging of the wireless power receiver through an extension of coverage distance and collaboration between the transmitters, and a larger number of wireless power receivers can be charged.

As described above, while configurations of the present invention have been described with reference to the accompanying drawings, these configurations are only examples. It should be apparent to those skilled in the art that various modifications and alterations may be made within the scope of the present invention. Therefore, it should be understood that the scope of the present invention is defined not by the detailed description of the invention but by the appended claims.

What is claimed is:

1. A wireless power transmitter comprising:
an array antenna module configured to transmit microwaves; and
a local controller configured to control the array antenna module to wirelessly transmit power to a wireless power receiver using the microwaves,
wherein the array antenna module comprises:
an array of microstrip patch antennas arranged in a plurality of rows, each rose comprising two or more microstrip patch antennas connected in series,
an amplifier configured to amplify microwaves from the array of microstrip patch antennas,
a phase shifter configured to change phase of channels of the microstrip patch antennas, and
a synchronizer configured to synchronize channels of the array of microstrip patch antennas,
wherein the local controller is further configured to:
perform a beam-scanning operation for transmitting a search signal,
in response to the search signal, receive a response signal from the wireless power receiver,
process the response signal to obtain wireless power transmission information, and
based on the obtained wireless power transmission information, change one or more settings for beamforming of the microwaves output from the array antenna module.

2. The wireless power transmitter of claim 1, wherein, in each row of the array of microstrip patch antennas, the two or more microstrip patch antennas are arranged to form a closed loop, wherein the plurality of rows of microstrip patch antennas are stacked in a cylindrical shape, wherein the amplifier inside the closed loop when viewed along a central axis of the cylindrical shape.

3. The wireless power transmitter of claim 1, wherein a gain value of the array antenna module is expressed by Equation 1:

$$E_t = E_{se} \times AF,$$ [Equation 1]

wherein $E_t$ denotes a gain value of the array antenna, Ese denotes a gain value of a single patch antenna, and AF denotes an array vector value.

4. The wireless power transmitter of claim 1, wherein the wireless power transmission information includes at least one of obstacle position information, moving state information, optimal wireless power transmission path information, charging state information of the wireless power receiver, and charging priority information.

5. The wireless power transmitter of claim 1, wherein the wireless power transmitter is configured to transmit the microwaves to a corresponding wireless power receiver according to preset charging priority information.

6. A charging system comprising:
a plurality of wireless newer transmitters, each comprising an array antenna module configured to transmit microwaves and a local controller configured to control the array antenna module to wirelessly transmit power to a wireless power receiver using the microwaves; and
a power distribution controller configured to control the plurality of wireless power transmitters so that power of the microwaves radiated from each of the plurality of wireless power transmitters is distributed and transmitted to the wireless power receiver,
wherein the array antenna module comprises:
an array of microstrip patch antennas arranged in a plurality of rows, each row comprising two or more microstrip patch antennas connected in series,
an amplifier configured to amplify microwaves from the array of microstrip patch antennas,
a phase shifter configured to change phase of channels of the microstrip patch antennas, and
a synchronizer configured to synchronize channels of the array of microstrip patch antennas,
wherein the local controller is further configured to:
perform a beam-scanning operation for transmitting a search signal,
in response to the search signal, receive a response signal from the wireless power receiver,
process the response signal to obtain wireless power transmission information, and
based on the obtained wireless power transmission information, change one or mom settings for beam forming of the microwaves from the array antenna module.

7. A wireless power-providing method using a wireless power transmitter, the method comprising:
performing, at the wireless power transmitter, a beam-scanning operation for transmitting a search signal, wherein the wireless power transmitter comprises an array antenna module configured to transmit microwaves and a local controller configured to control the array antenna module to wirelessly transmit power to a wireless power receiver using the microwaves, wherein the array antenna module comprises: an array of microstrip patch antennas arranged in a plurality of rows, each row comprising two or more microstrip patch antennas connected in series, an amplifier configured to amplify microwaves from the array of microstrip patch antennas, a phase shifter configured to change phase of channels of the microstrip patch antennas, and a synchronizer configured to synchronize channels of the array of microstrip patch antennas;
in response to the search signal, receiving a response signal from the wireless power receiver;
processing the response signal to obtain wireless power transmission information; and
based on the obtained wireless power transmission information, changing one or more settings for beamforming of the microwaves from the array antenna module.

8. The method of claim 7, wherein the wireless power transmission information includes at least one of obstacle position information, moving state information, optimal wireless power transmission path information, charging status information of the wireless power receiver, and charging priority information.

9. The method of claim 7, further comprising: transmitting, at the wireless power transmitter, the microwaves to the wireless power receiver according to preset charging priority information.

* * * * *